United States Patent
Shen et al.

(10) Patent No.: US 8,565,775 B2
(45) Date of Patent: Oct. 22, 2013

(54) METHODS AND APPARATUS FOR COMMON CHANNEL CANCELLATION IN WIRELESS COMMUNICATIONS

(75) Inventors: Qiang Shen, San Diego, CA (US); Nathan Yee, Cupertino, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1099 days.

(21) Appl. No.: 12/146,232

(22) Filed: Jun. 25, 2008

(65) Prior Publication Data

US 2009/0325586 A1 Dec. 31, 2009

(51) Int. Cl.
- *H04W 72/00* (2009.01)
- *H04J 11/00* (2006.01)
- *H04B 7/14* (2006.01)
- *H04L 12/413* (2006.01)

(52) U.S. Cl.
USPC ............ 455/450; 370/201; 370/445; 370/316

(58) Field of Classification Search
USPC .................................. 455/101, 522, 524, 525
See application file for complete search history.

(56) References Cited

U.S. PATENT DOCUMENTS

| | | | | |
|---|---|---|---|---|
| 6,333,947 B1 * | 12/2001 | van Heeswyk et al. | | 375/148 |
| 6,718,162 B1 * | 4/2004 | Agin et al. | | 455/63.1 |
| 6,934,245 B2 * | 8/2005 | Kwak et al. | | 370/204 |
| 7,190,681 B1 * | 3/2007 | Wu | | 370/316 |
| 7,555,068 B2 * | 6/2009 | Dabak et al. | | 375/340 |
| 7,742,386 B2 * | 6/2010 | Jones et al. | | 370/201 |
| 2001/0006531 A1 | 7/2001 | Okuyama | | |
| 2003/0063621 A1 * | 4/2003 | Tzou et al. | | 370/445 |
| 2004/0213146 A1 * | 10/2004 | Jones et al. | | 370/210 |
| 2005/0195921 A1 | 9/2005 | Abe | | |
| 2006/0034162 A1 * | 2/2006 | Jones et al. | | 370/201 |
| 2006/0062166 A1 * | 3/2006 | Jones et al. | | 370/289 |

FOREIGN PATENT DOCUMENTS

| | | |
|---|---|---|
| CN | 1661993 A | 8/2005 |
| EP | 0876002 A2 | 11/1998 |
| EP | 1569356 A1 | 8/2005 |
| EP | 1739850 A2 | 1/2007 |
| GB | 2384662 A | 7/2003 |
| JP | 2001251228 A | 9/2001 |
| KR | 20060043155 A | 5/2006 |
| WO | WO0055992 A1 | 9/2000 |
| WO | WO2006071761 | 7/2006 |

OTHER PUBLICATIONS

Sawahashi M., et al., "Multipath Interference Canceller for Orthogonal Multiplexed Channel and its Performance in W-CDMA Forward Link," Technical Report of the Institute of Electronics, Information and Communication Engineers, Jan. 12, 2001, vol. 100, No. 558, pp. 27-33, RCS2000-195.

(Continued)

*Primary Examiner* — Tilahun B Gesesse
(74) *Attorney, Agent, or Firm* — Rupit M. Patel (57) ABSTRACT

A mobile station that is configured to perform common channel cancellation may include a parameter estimation unit that is configured to estimate parameters for generating a common channel error. The mobile station may also include a common channel generation unit that is configured to generate the common channel error based on the parameters. The mobile station may also include an adder that is configured to subtract the common channel error from received data samples.

21 Claims, 8 Drawing Sheets

(56) References Cited

OTHER PUBLICATIONS

Siemens, "Removal of ODMA related abbreviations and correction of references" 3GPP R1-00-1031, Aug. 25. 2000.
Taiwan Search Report—TW098121434—TIPO—Aug. 27, 2012.
International Search Report and Written Opinion—PCT/US2009/048529—ISA/EPO—Sep. 15, 2009.
Iwakiri N: "Interference Reduction Efficiency of a Turbo Coded CDMA Multilayer System Equipped with a Pilot Canceler" Vehicular Technology Conference, 1999. VTC 1999—Fall IEEE VTS 50th Amsterdam, Netherlands Sep. 19-22, 1999, Piscataway, NJ, USA, IEEE, US, vol. 1, Sep. 19, 1999, pp. 391-395, XP010352887 ISBN: 978-0-7803-5435-7 abstract.

* cited by examiner

METHODS AND APPARATUS FOR COMMON CHANNEL CANCELLATION IN WIRELESS COMMUNICATIONS

TECHNICAL FIELD

The present disclosure relates generally to communication networks. More specifically, the present disclosure relates to methods and apparatus for common channel cancellation in wireless communications.

BACKGROUND

As used herein, the term "mobile station" refers to an electronic device that may be used for voice and/or data communication over a wireless communication network. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

A wireless communication network may provide communication for a number of mobile stations, each of which may be serviced by a base station. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication network (e.g., bandwidth and transmit power) may be shared among multiple mobile stations. A variety of multiple access techniques are known, including code division multiple access (CDMA), time division multiple access (TDMA), frequency division multiple access (FDMA), and orthogonal frequency division multiple access (OFDMA).

Benefits may be realized by improved methods and apparatus related to the operation of wireless communication networks.

DETAILED DESCRIPTION

A mobile station that is configured to perform common channel cancellation is disclosed. The mobile station may include a parameter estimation unit that is configured to estimate parameters for generating a common channel error. The mobile station may also include a common channel generation unit that is configured to generate the common channel error based on the parameters. The mobile station may also include an adder that is configured to subtract the common channel error from received data samples.

A mobile station that is configured to perform common channel cancellation is disclosed. The mobile station may include means for estimating parameters for generating a common channel error. The mobile station may also include means for generating the common channel error based on the parameters. The mobile station may also include means for subtracting the common channel error from received data samples.

A method for performing common channel cancellation is disclosed. The method may include estimating parameters for generating a common channel error. The method may also include generating the common channel error based on the parameters. The method may also include subtracting the common channel error from received data samples.

A computer-program product for performing common channel cancellation is disclosed. The computer-program product may include a computer-readable medium having instructions thereon. The instructions may include code for estimating parameters for generating a common channel error. The instructions may also include code for generating the common channel error based on the parameters. The instructions may also include code for subtracting the common channel error from received data samples.

The transmission techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, Spatial Division Multiple Access (SDMA) systems, multiple-input multiple-output (MIMO) systems, and so forth. The terms "system" and "network" may be used interchangeably herein.

A CDMA system may implement a radio technology such as Universal Terrestrial Radio Access (UTRA), cdma2000, etc. UTRA includes Wideband CDMA (W-CDMA) and other CDMA variants. The cdma2000 technology covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc.

UTRA and E-UTRA are part of UMTS. 3GPP Long Term Evolution (LTE) is a release of UMTS that uses E-UTRA. UTRA, E-UTRA, UMTS, LTE and GSM are described in documents from an organization named the "3rd Generation Partnership Project" (3GPP). UMB and cdma2000 are described in documents from an organization named the "3rd Generation Partnership Project 2" (3GPP2).

Figure 1:
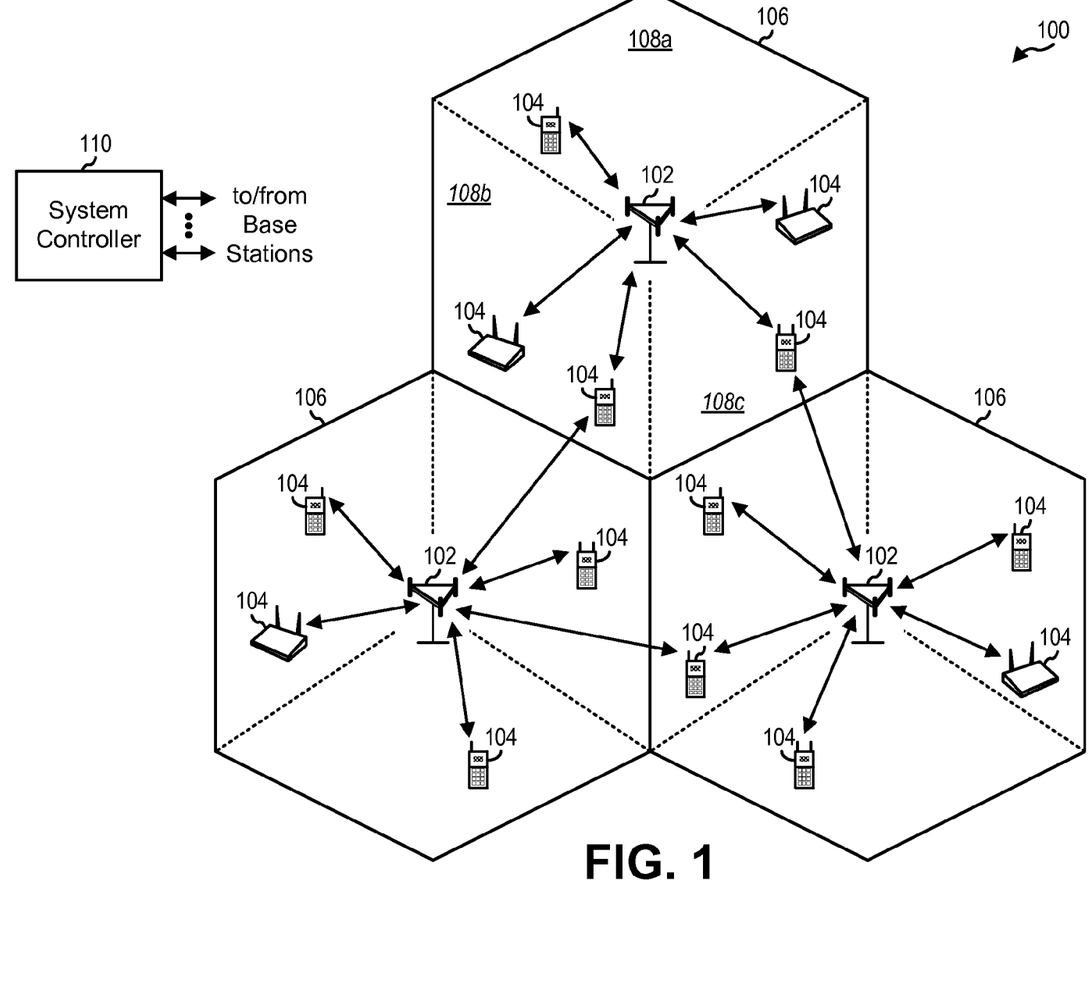
FIG. 1 illustrates an example of a wireless communication network.

FIG. 1 illustrates an example of a wireless communication network 100 with multiple base stations (BS) 102 and multiple mobile stations (MS) 104. A base station 102 is a station that communicates with the mobile stations 104. A base station 102 may also be called, and may contain some or all of the functionality of, an access point, a Node B, an evolved Node B, etc. Each base station 102 provides communication coverage for a particular geographic area 106. The term "cell" can refer to a base station 102 and/or its coverage area 106 depending on the context in which the term is used. To improve system capacity, a base station coverage area 106 may be partitioned into multiple smaller areas, e.g., three smaller areas 108a, 108b, and 108c. Each smaller area 108ab 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile stations 104 are typically dispersed throughout the network 100. A mobile station 104 may also be called, and may contain some or all of the functionality of, a terminal, an access terminal, user equipment, a subscriber unit, a station, etc. A mobile station 104 may be a cellular phone, a personal digital assistant (PDA), a wireless device, a wireless modem, a handheld device, a laptop computer, etc. A mobile station 104 may communicate with zero, one, or multiple base stations 104 on the downlink (DL) and/or uplink (UL) at any given moment. The downlink (or forward link) refers to the communication link from the base stations 102 to the mobile stations 104, and the uplink (or reverse link) refers to the communication link from the mobile stations 104 to the base stations 102.

For a centralized architecture, a system controller 110 may couple to base stations 102 and provide coordination and control for these base stations 102. The system controller 110 may be a single network entity or a collection of network entities. For a distributed architecture, base stations 102 may communicate with one another as needed.

Figure 2:
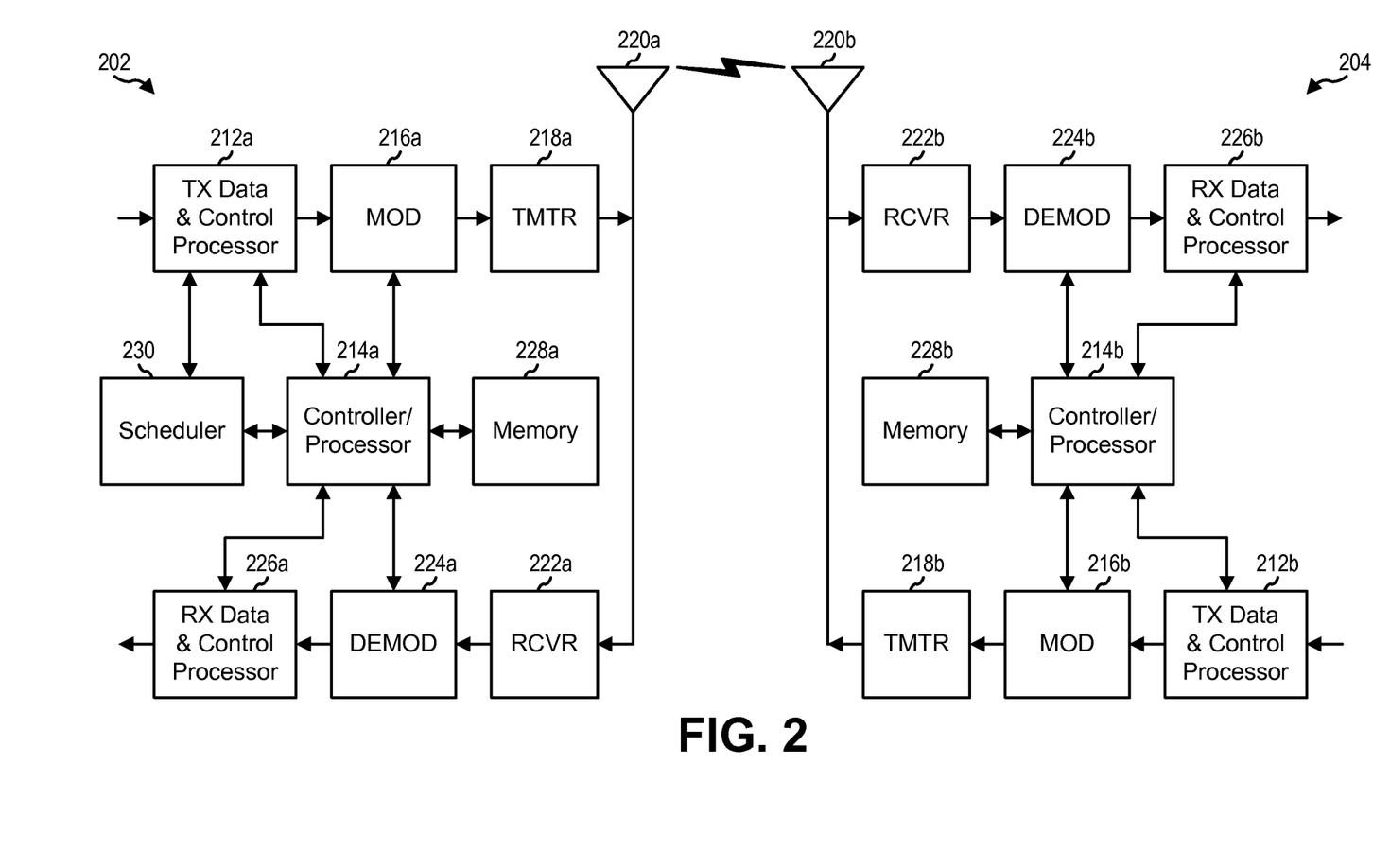
FIG. 2 illustrates certain components that may be included within a base station and a mobile station.

FIG. 2 illustrates certain components that may be included within a base station 202 and a mobile station 204. At the base station 202, a transmit (TX) data and control processor 212a may receive traffic data from a data source (not shown) and/or control information from a controller/processor 214a. The transmit data and control processor 212a may process (e.g., format, encode, interleave, and symbol map) the traffic data and control information and provide modulation symbols. A modulator (MOD) 216a may process the modulation symbols (e.g., for OFDM) and provide output chips. A transmitter (TMTR) 218a may process (e.g., convert to analog, amplify, filter, and upconvert) the output chips and generate a downlink signal, which may be transmitted via an antenna 220a.

At the mobile station 204, an antenna 220b may receive the downlink signals from the base station 202 and other base stations and may provide a received signal to a receiver (RCVR) 222b. The receiver 222b may condition (e.g., filter, amplify, downconvert, and digitize) the received signal and provide received samples. A demodulator (DEMOD) 224b may process the received samples (e.g., for OFDM) and provide demodulated symbols. A receive (RX) data and control processor 226b may process (e.g., symbol demap, deinterleave, and decode) the demodulated symbols to obtain decoded data and control information for the mobile station 204.

On the uplink, at the mobile station 204, data and control information to be sent by the mobile station 204 may be processed by a TX data and control processor 212b, modulated by a modulator 216b, conditioned by a transmitter 218b, and transmitted via an antenna 220b. At the base station 202, the uplink signals from the mobile station 204 and possibly other mobile stations may be received by an antenna 220a, conditioned by a receiver 222a, demodulated by a demodulator 224a, and processed by an RX data and control processor 226a to recover the data and control information sent by the mobile station 204. The processing for uplink transmission may be similar to or different from the processing for downlink transmission.

Controllers/processors 214a and 214b may direct the operation at the base station 202 and the mobile station 204, respectively. Memories 228a and 228b may store data and program codes for the base station 202 and the mobile station 204, respectively. A scheduler 230 may schedule mobile stations 204 for downlink and/or uplink transmission and may provide assignments of system resources.

In a wireless communication network, such as a WCDMA mobile network, there may be several common channels that are used for various network maintenance purposes, including synchronization, paging, system information, etc. Usually, common channels are of higher power to ensure network operations, so they may impose interference to other traffic channels.

Some common channels can be designed to appear orthogonal to other channels in the same cell to reduce their interference. However, some common channels cannot be designed that way because of the special purpose of such channels. One example is the synchronization channel (SCH) in a WCDMA network. Because the SCH is used for a mobile station to synchronize to the network before it can acquire other network information, the SCH is not spread with the same scrambling code that is applied to other channels of the cell, so the SCH does not appear orthogonal to other channels after they are removed of scrambling codes. The interference of the SCH to other channels in a particular cell may become more severe with higher geometry (where "geometry" refers to the total cell signal level relative to other cell interference), where interference from other cells is smaller than interference from the cell under consideration. Consequently, to achieve optimal network performance, it may be desirable to properly mitigate interference from the SCH and other similar common channels.

The present disclosure addresses cancelling of such common channels by taking synchronization channel cancelation (SCHIC) as one specific example. The SCH can be canceled at the receiver by first reproducing the SCH at a specific stage of a receiver data chain, and then subtracting the SCH from the received data samples.

The present disclosure describes different ways to perform SCH cancellation at the receiver. The present disclosure also describes several methods for estimating the SCH level and phase for accurately reproducing the SCH at the receiver.

SCH cancellation can be applied at different stages of a receiver data path. For example, SCH cancellation may be performed before multipath processing is performed. Alternatively, SCH cancellation may be performed after multipath processing is performed. Different methods for reproducing the SCH may be utilized depending on the stage of the receiver data path where SCH cancellation occurs.

As used herein, the term "multipath processing" refers to any data processing that mitigates or combines signals that are transmitted through multiple data paths, due to multipath fading, transmit diversity, etc. Such processing can be performed by rake combining, equalization, multiuser detection, or any other processing algorithms that properly remove multipath interference and combine the signal energy scattered on multiple transmission paths in an attempt to achieve the highest signal-to-noise power ratio.

Figure 3:
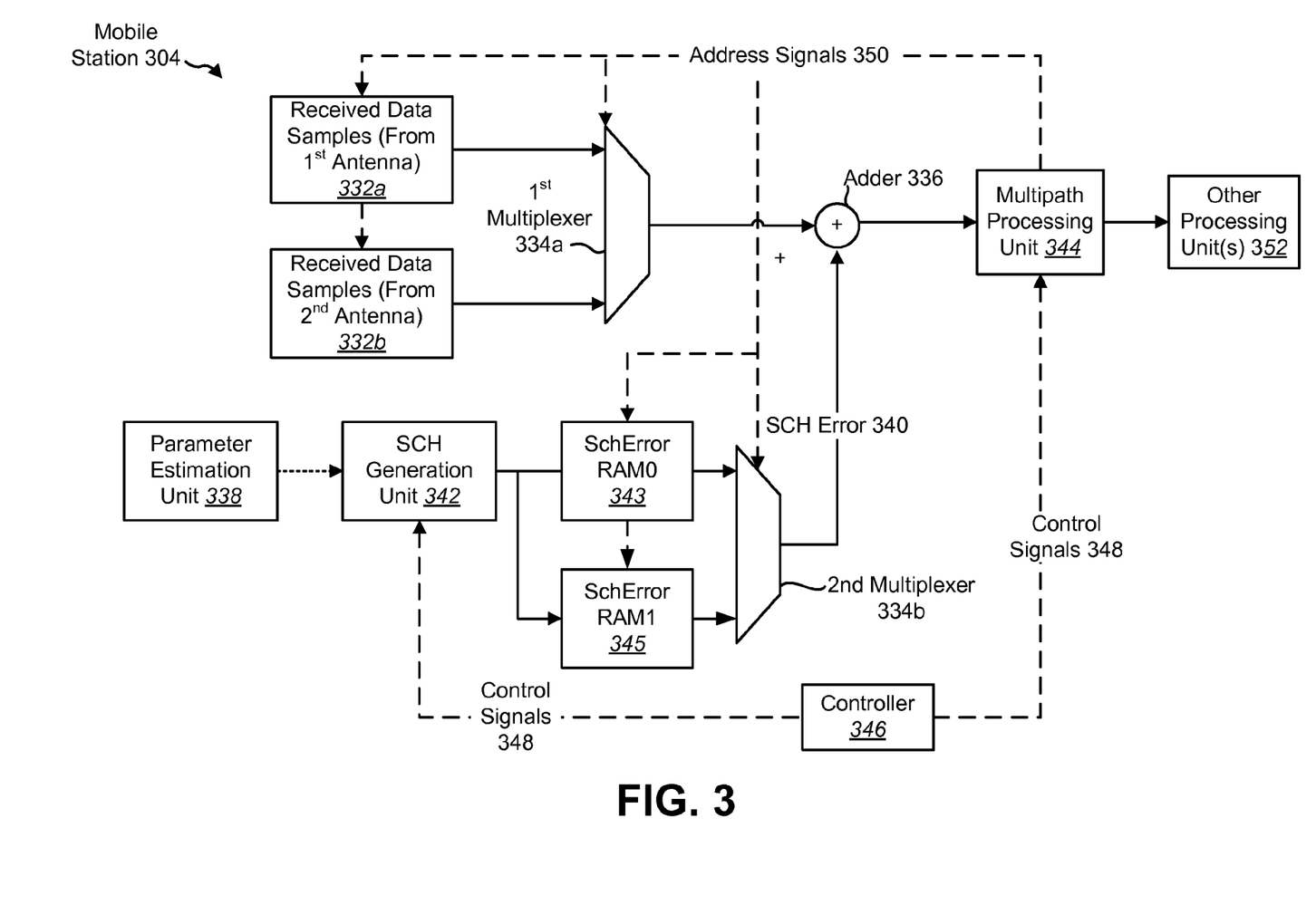
FIG. 3 illustrates certain components that may be included within a mobile station that is configured to perform synchronization channel (SCH) cancellation before multipath processing is performed.

Reference is now made to FIG. 3. FIG. 3 illustrates certain components that may be included within a mobile station 304 that is configured to perform SCH cancellation before multipath processing is performed.

The mobile station 304 includes two receiving antennas (not shown). Received data samples 332a from the first receiving antenna and received data samples 332b from the second receiving antenna are multiplexed by a first multiplexer 334a. The output of the first multiplexer 334a is provided to an adder 336.

A parameter estimation unit 338 estimates parameters for generating the SCH error 340. These parameters are provided to an SCH generation unit 342.

The adder 336 subtracts the SCH error 340 from the received data samples 332 (i.e., the output of the first multiplexer 334a). The output of the adder 336 is provided to the multipath processing unit 344.

The outputs of the SCH generation unit 342 can be saved into intermediate memories 343, 345 for them to be applied to the adder 336 at the time that is in synchronization with the data path.

A controller 346 provides control signals 348 to the SCH generation unit 342 and the multipath processing unit 344. The multipath processing unit 344 provides address signals 350.

Figure 4:
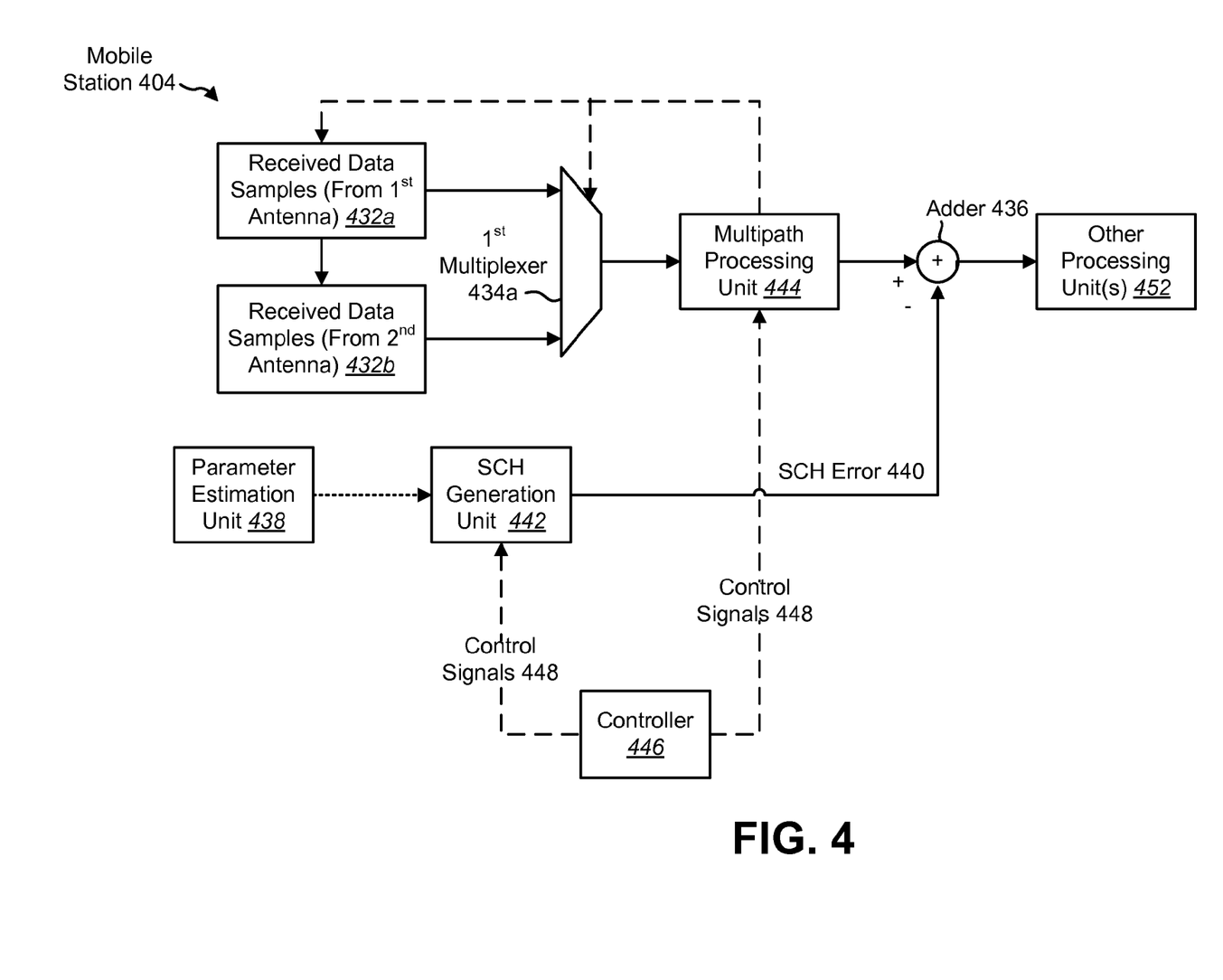
FIG. 4 illustrates certain components that may be included within a mobile station that is configured to perform SCH cancellation after multipath processing is performed.

Reference is now made to FIG. 4. FIG. 4 illustrates certain components that may be included within a mobile station 404 that is configured to perform SCH cancellation after multipath processing is performed.

The mobile station 404 includes a first receiving antenna and a second receiving antenna (not shown). The received data samples 432a from the first receiving antenna and the received data samples 432b from the second receiving antenna are multiplexed by a first multiplexer 434a. The output of the first multiplexer 434a is provided to a multipath processing unit 444, which performs multipath processing. The output of the multipath processing unit 444 is provided to an adder 436.

A parameter estimation unit 438 estimates parameters for generating the SCH error 440. These parameters are provided to the SCH generation unit 442. The SCH generation unit 442 generates the SCH error 440 based on the parameters that are provided by the parameter estimation unit 438. The SCH error 440 is provided to the adder 436. The adder 436 subtracts the SCH error 440 from the received data samples 432 after multipath processing has been performed with respect to the received data samples 432. The output of the adder 436 may be provided to one or more other processing units 452.

It may also be convenient to save the output of the SCH generation unit 442 into intermediate memories before they are applied to the adder 436, as in FIG. 3, for the purpose of synchronizing SCH application with data path timing.

A controller 446 provides control signals 448 to the SCH generation unit 442 and to the multipath processing unit 444.

The parameters that are used to generate the SCH error may include the SCH gain. In order to determine the SCH gain, the desired SCH power level (i.e., the power level that is experienced by SCH signals at the point of cancellation) may be determined. Some examples of methods for determining the SCH power level will now be described.

In WCDMA systems, the SCH power level is seldom changed relative to a common pilot channel, even though the cell load and channel condition may change. Consequently, it may be advantageous to estimate such a ratio accurately, and then apply the instantaneous estimation of the common pilot power level to obtain the desired SCH power level. Thus, the SCH gain may be determined based on an estimated ratio of the SCH power level relative to a common pilot channel power level.

There are several potential advantages of such a method. First, because it is typically unchanged, such a relative gain can be estimated less frequently and more accurately with longer estimation time or smaller filtering bandwidth. Secondly, such a relative gain can be estimated by a processing unit that is not part of the receiving data path. The processing unit that estimates the relative gain may have a different gain than the signal data path, because the relative gain would not be affected.

The relative gain of the SCH channel to the common pilot channel can be estimated through different methods. For example, it can be obtained by estimating the SCH symbol level and the pilot symbol level at the same time periods, and dividing the SCH symbol level with the pilot symbol level. Further filtering can be applied to increase the estimation accuracy.

Stated generally, the SCH gain may be estimated relative to a reference second common channel. The common pilot channel is an example of a reference second common channel.

As an alternative to the above method of relative gain estimation, one can also estimate the SCH power level directly. In other words, the SCH gain may be determined based on direct estimation of the SCH power level.

The parameters that are used to generate the SCH error may also include the channel impulse response (CIR). The channel impulse response can be estimated through various methods. For example, the channel impulse response can be estimated through correlating a pilot sequence with the received data at various delay offsets to obtain the channel response at different time delays. The channel impulse response may be used in different ways depending on the stage of the receiver data path where SCH cancellation occurs.

Figure 5:
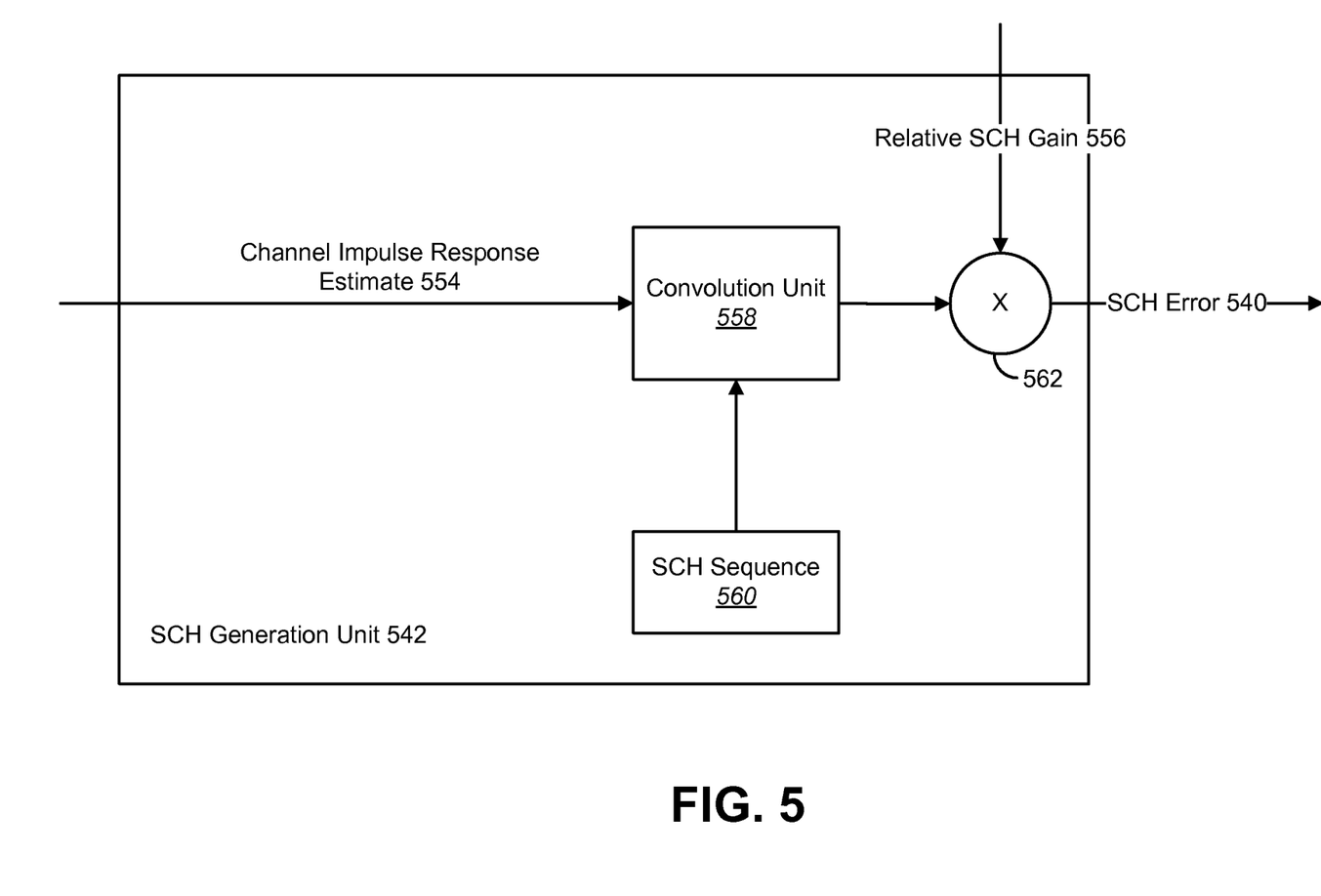
FIG. 5 illustrates an example of an SCH generation unit.

Reference is now made to FIG. 5. FIG. 5 illustrates an example of an SCH generation unit 542. The SCH generation unit 542 shown in FIG. 5 may be used in a mobile station that is configured to perform SCH cancellation before multipath processing is performed (such as the mobile station 304 that is shown in FIG. 3).

The SCH generation unit 542 receives the channel impulse response estimate 554 and the SCH gain 556 from the parameter estimation unit. The SCH generation unit 542 includes a convolution unit 558. The convolution unit 558 performs a convolution operation with respect to the channel impulse response estimate 554 and the SCH sequence 560. More specifically, the channel impulse response estimate 554 is convolved with the SCH sequence 560. The SCH generation unit 542 includes a multiplier 562 that multiplies the result of the convolution operation by the relative SCH gain 556.

For a post-multipath processing scheme, if an equalizer is used, the channel impulse response may be convolved with equalizer taps to arrive at an equivalent gain for SCH symbols. If a rake receiver is used, the pilot estimation of each rake finger may be used as the channel gain on that path, and the equivalent gain at the rake combiner output can be calculated with pilot estimation and combining weights.

According to the WCDMA standard, when there is transmission diversity from a Node B, the SCH channel may be transmitted alternatively from two transmit antennas. If transmission diversity is utilized, the channel impulse response from different transmission antennas may be estimated and used according to which transmission antenna was used to transmit the SCH channel.

Figure 6:
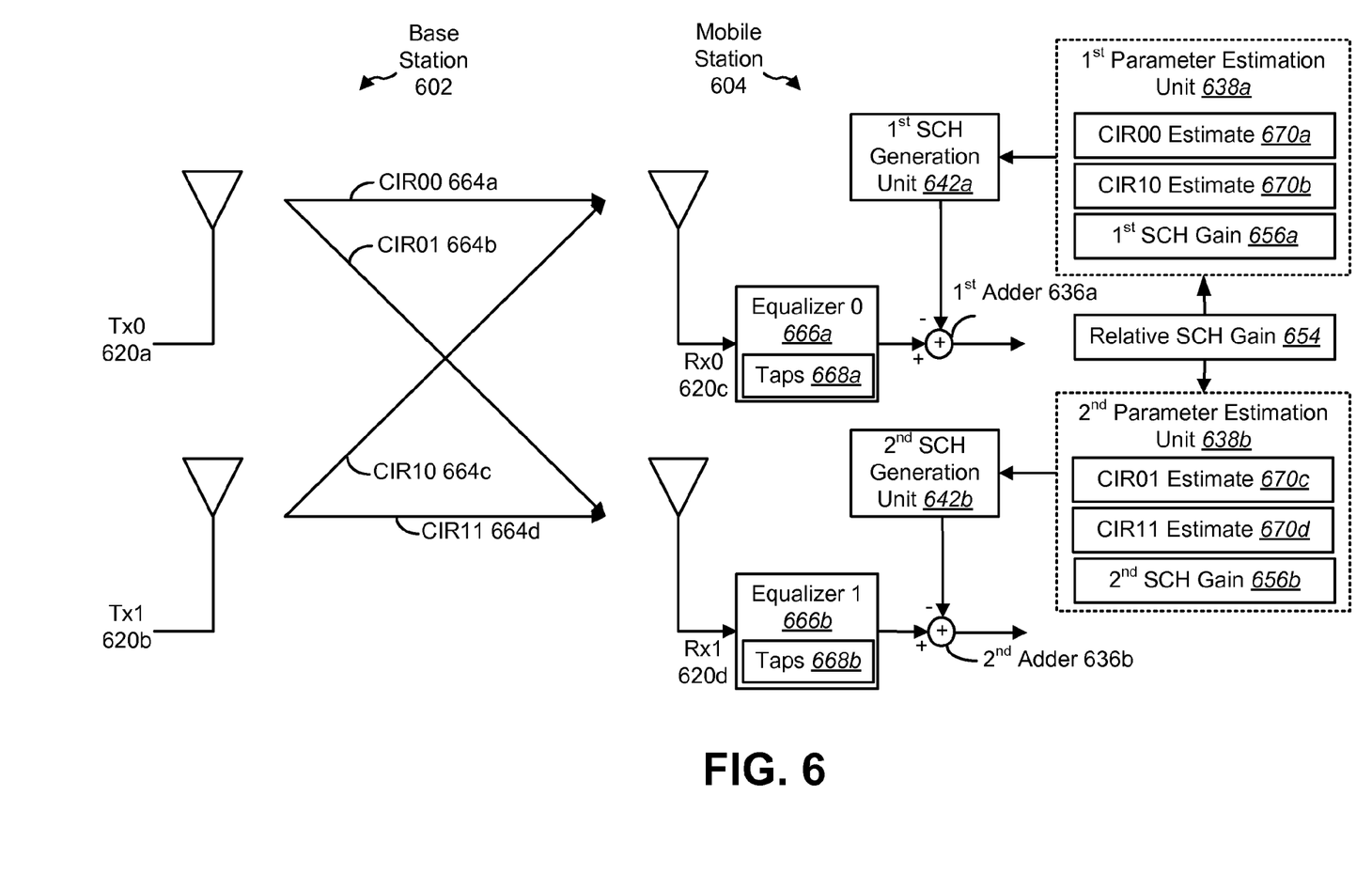
FIG. 6 illustrates certain components that may be included within a base station that utilizes transmission diversity, and certain components that may be included within a mobile station that is configured to account for transmission diversity when calculating the SCH gain.

Reference is now made to FIG. 6. FIG. 6 illustrates certain components that may be included within a base station 602 that utilizes transmission diversity, and certain components that may be included within a mobile station 604 that is configured to account for transmission diversity when calculating the SCH gain 656.

The base station 602 includes two transmitting antennas 620. These transmitting antennas 620 will be referred to as transmitting antenna zero (TX0) 620*a* and transmitting antenna one (TX1) 620*b*. Similarly, the mobile station 604 includes two receiving antennas 620, which will be referred to as receiving antenna zero (RX0) 620*c* and receiving antenna one (RX1) 620*d*.

The channel impulse response 664*a* from transmitting antenna zero 620*a* to receiving antenna zero 620*c* will be referred to as CIR00 664*a*. The channel impulse response 664*b* from transmitting antenna zero 620*a* to receiving antenna one 620*d* will be referred to as CIR01 664*b*. The channel impulse response 664*c* from transmitting antenna one 620*b* to receiving antenna zero 620*c* will be referred to as CIR10 664*c*. The channel impulse response 664*d* from transmitting antenna one 620*b* to receiving antenna one 620*d* will be referred to as CIR11 664*d*.

At the mobile station 604, the signals that are received by receiving antenna zero 620*c* are processed by an equalizer 666*a*, which will be referred to as equalizer zero 666*a*. Similarly, the signals that are received by receiving antenna one 620*d* are processed by another equalizer 666*b*, which will be referred to as equalizer one 666*b*. Both equalizer zero 666*a* and equalizer one 666*b* may use a tapped delay line structure.

The mobile station 604 includes a first parameter estimation unit 638*a*. The first parameter estimation unit 638*a* determines an estimate 670*a* of CIR00 664*a* and an estimate 670*b* of CIR10 664*c*. The first parameter estimation unit 638*a* calculates a first SCH gain 656*a* as follows.

If the SCH is being transmitting from transmitting antenna zero 620*a*, then the first SCH gain 656*a* is calculated as:

$$G = (\text{CIR00} * EQ0) \times G_s \quad (1)$$

In equation (1), the term "CIR00" refers to the CIR00 Estimate 670*a*, and the term "EQ0" refers to the taps 668*a* of equalizer zero 666*a*. The expression "CIR00* EQ0" refers to the convolution of the two sets of sequences at time 0, or:

$$CIR_{00}(n) \otimes EQ_0(n)|_{n=0} = \sum_i CIR_{00}(-i) \times EQ_0(i) \quad (2)$$

Gs is the relative gain of the SCH channel. When CIR represents the channel response of the common pilot channel, Gs is the relative gain of the SCH channel to the common pilot channel. The sign × means multiplication.

If the SCH is being transmitted from transmitting antenna one 620*b*, then the first SCH gain 656*a* is calculated as:

$$G = (\text{CIR10} * EQ0) \times G_s \quad (3)$$

In equation (3), the term "CIR10" refers to the CIR10 Estimate 670*b*, and the term "EQ0" refers to the taps 668*a* of equalizer zero 666*a*.

A first SCH generation unit 642*a* determines the SCH error based on parameters that received from the first parameter estimation unit 638*a*. A first adder 636*a* subtracts the SCH error (determined by the first SCH generation unit 642*a*) from the output of equalizer zero 666*a*.

The mobile station 604 includes a second parameter estimation unit 638*b*. The second parameter estimation unit 638*b* determines an estimate 670*c* of CIR01 664*b* and an estimate 670*d* of CIR11 664*d*.

The first parameter estimation unit 638*a* calculates a second SCH gain 656*b* as follows. If the SCH is being transmitting from transmitting antenna zero 620*a*, then the second SCH gain 656*b* is calculated as:

$$G = (\text{CIR01} * EQ1) \times G_s \quad (4)$$

In equation (4), the term "CIR01" refers to the CIR01 Estimate 670*c*, and the term "EQ1" refers to the taps 668*b* of equalizer one 666*b*.

If the SCH is being transmitted from transmitting antenna one 620*b*, then the second SCH gain 656*b* is calculated as:

$$G = (\text{CIR11} * EQ1) \times G_s \quad (5)$$

In equation (5), the term "CIR11" refers to the CIR11 Estimate 670*d*, and the term "EQ1" refers to the taps 668*b* of equalizer one 666*b*.

A second SCH generation unit 642*b* determines the SCH error based on parameters that received from the second parameter estimation unit 638*b*. A second adder 636*b* subtracts the SCH error (determined by the second SCH generation unit 642*b*) from the output of equalizer one 666*b*.

Thus, in FIG. 6, the parameter estimation units 638*a*, 638*b* are configured to account for the use of transmission diversity that is utilized by the base station 602. More specifically, the parameter estimation units 638*a*, 638*b* are configured to estimate the SCH gain between different pairs of channel impulse response estimates 670 and equalizer taps 668. The relative SCH gain 644 used by parameter estimation units 638*a* and 638*b* are the same, and can be shared between the two units.

Figure 7:
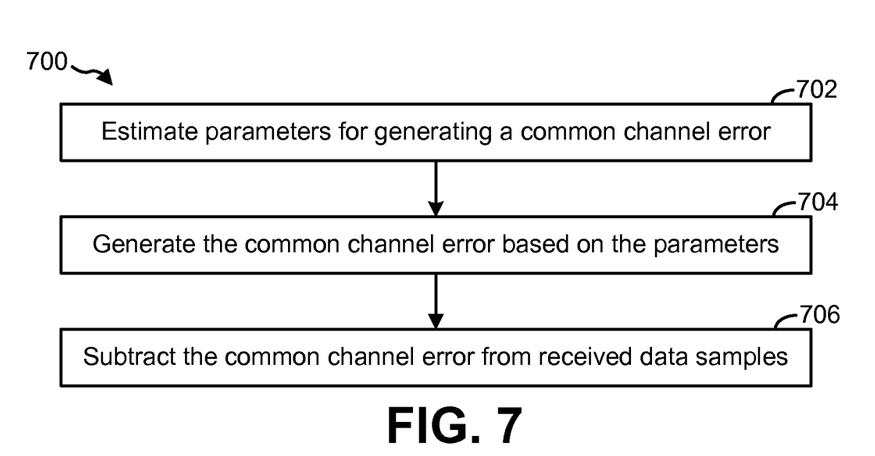
FIG. 7 illustrates an example of a method for performing common channel cancellation.

Reference is now made to FIG. 7. FIG. 7 illustrates an example of a method 700 for performing common channel cancellation. The method 700 may be performed by a mobile station (such as the mobile station 304 shown in FIG. 3 or the mobile station 404 shown in FIG. 4).

The method 700 may include estimating 702 parameters for generating a common channel error. Such parameters may include the common channel gain (e.g., the SCH gain) and the channel impulse response estimate.

The method 700 may also include generating 704 the common channel error based on the parameters that are determined 702. If the common channel error is determined before multipath processing is performed, then this may involve performing a convolution operation with respect to the channel impulse response estimate and the common channel sequence, as discussed above. For a post-multipath processing scheme, if an equalizer is used, the channel impulse response may be convolved with equalizer taps to arrive at an equivalent gain for common channel symbols. If a rake receiver is used, the pilot estimation of each rake finger may be used as the channel gain on that path, and the equivalent gain at the rake combiner output can be calculated with pilot estimation and combining weights.

The method 700 may also include subtracting 706 the common channel error from received data samples. This may be performed either before multipath processing is performed (as shown above in relation to FIG. 3), or after multipath processing is performed (as shown above in relation to FIG. 4).

Figure 8:
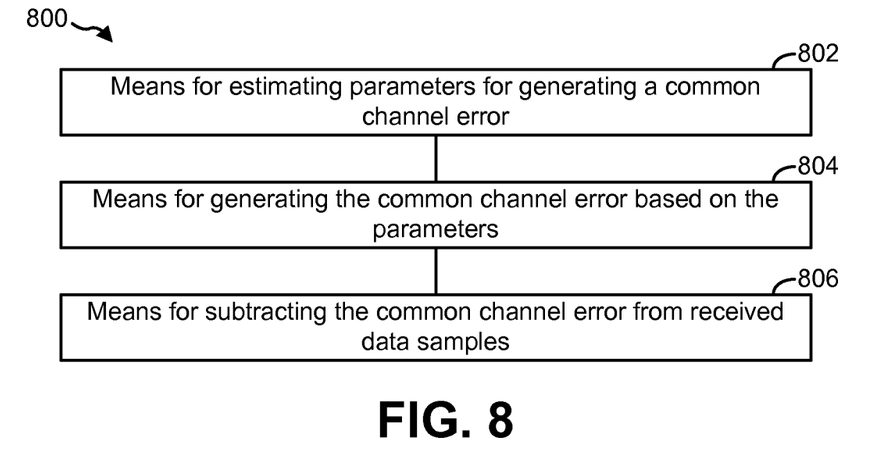
FIG. 8 illustrates means-plus-function blocks corresponding to the method of FIG. 7.

The method 700 of FIG. 7 described above may be performed by various hardware and/or software component(s) and/or module(s) corresponding to the means-plus-function blocks 800 illustrated in FIG. 8. In other words, blocks 702 through 706 illustrated in FIG. 7 correspond to means-plus-function blocks 802 through 806 illustrated in FIG. 8.

Figure 9:
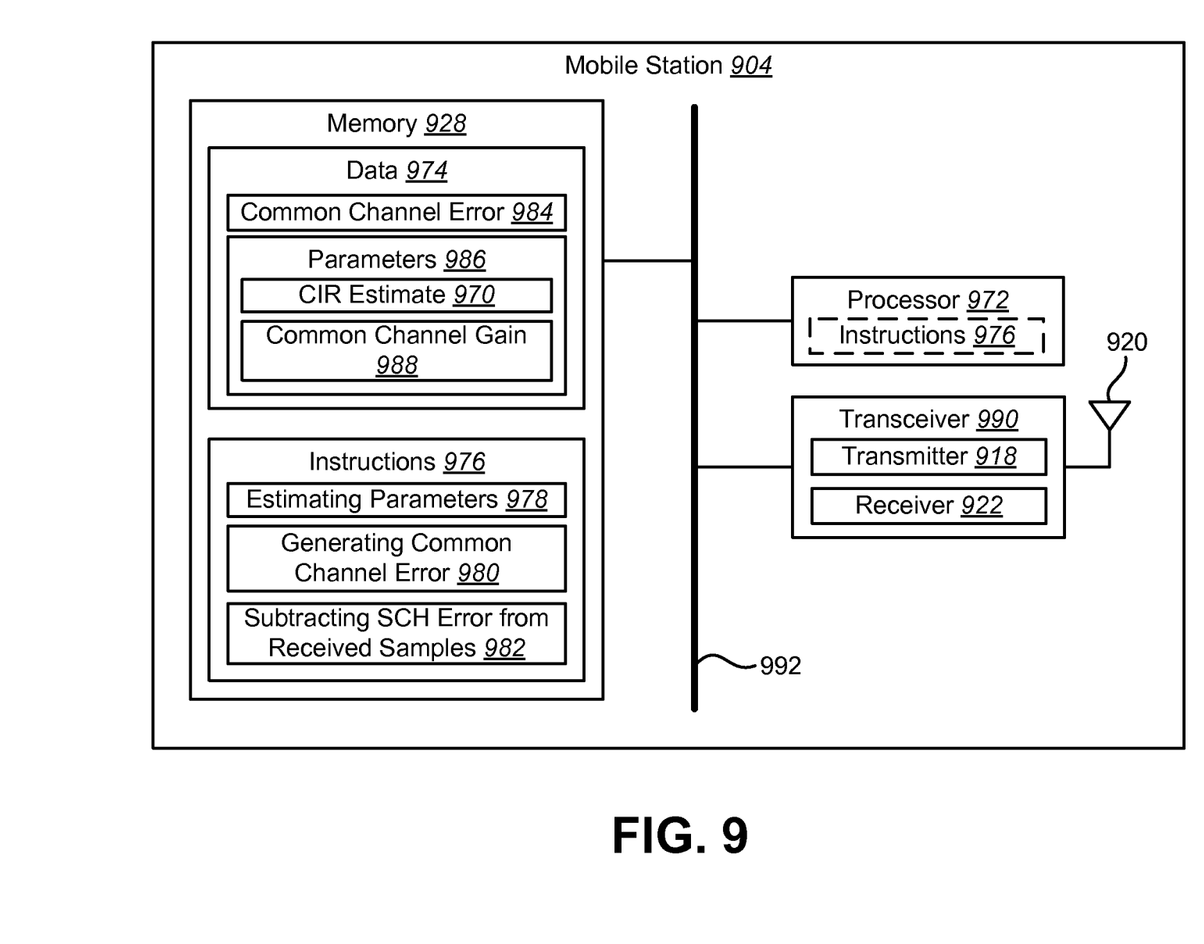
FIG. 9 illustrates certain components that may be included within a mobile station that is configured to perform common channel cancellation.

Reference is now made to FIG. 9. FIG. 9 illustrates certain components that may be included within a mobile station 904 that is configured to perform common channel cancellation.

The mobile station 904 includes a processor 972. The processor 972 may be a general purpose single- or multi-chip microprocessor (e.g., an ARM), a special purpose microprocessor (e.g., a digital signal processor (DSP)), a microcontroller, a programmable gate array, etc. The processor 972 may be referred to as a central processing unit (CPU). Although just a single processor 972 is shown in the mobile station 904 of FIG. 9, in an alternative configuration, a combination of processors (e.g., an ARM and DSP) could be used.

The mobile station 904 also includes memory 928. The memory 928 may be any electronic component capable of storing electronic information. The memory 928 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 974 and instructions 976 may be stored in the memory 928. The instructions 976 may be executable by the processor 972 to implement various functions. Executing the instructions 976 may involve the use of the data 974 that is stored in the memory 928.

Some examples of the data 974 in the memory 928 include: the common channel error 984 that is determined and the parameters 986 on which the common channel error 984 is based, including the channel impulse response estimate 970 and the common channel gain 988. Other types of data 974 that are relevant to implementing the techniques described herein may also be included in the memory 928.

Some examples of the instructions 976 in the memory 928 include: instructions 978 for estimating parameters for generating a common channel error, instructions 980 for generating the common channel error based on parameters that are estimated, and instructions 982 for subtracting the common channel error from received data samples. Other instructions 976 that are relevant to implementing the techniques described herein may also be included in the memory 928.

The mobile station 904 may also include a transmitter 918 and a receiver 922 to allow transmission and reception of signals between the mobile station 904 and a remote location (e.g., one or more base stations). The transmitter 918 and receiver 922 may be collectively referred to as a transceiver 990. An antenna 920 may be electrically coupled to the transceiver 990. The mobile station 904 may also include (not shown) multiple transmitters, multiple receivers, multiple transceivers and/or multiple antenna.

The various components of the mobile station 904 may be coupled together by one or more buses, which may include a power bus, a control signal bus, a status signal bus, a data bus, etc. For the sake of clarity, the various buses are illustrated in FIG. 9 as a bus system 992.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

The techniques described herein may be implemented by various means. For example, these techniques may be implemented in hardware, firmware, software, or a combination thereof For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, one or more computers, discrete gate or transistor logic, discrete hardware components, and so forth, including combinations thereof.

For a firmware and/or software implementation, the techniques may be implemented with modules (e.g., procedures, functions, programs, routines, sub-routines, etc.) that perform the functions described herein. The firmware and/or software instructions may be stored in a memory and executed by a processor. The memory may be implemented within the processor or external to the processor.

As used herein, the term "processor" should be interpreted broadly to encompass a general purpose processor, a microprocessor, a digital signal processor (DSP), a controller, a microcontroller, a state machine, and so forth. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc. Memory is said to be in electronic communication with a processor if the processor can read information from and/or write information to the memory. Memory may be integral to a processor and still be said to be in electronic communication with the processor.

As used herein, the terms "code" and "instructions" should be interpreted broadly to include any type of computer-readable statement(s). For example, the terms "code" and "instructions" may refer to one or more programs, routines, sub-routines, functions, procedures, etc. "Code" and "instructions" may comprise a single computer-readable statement or many computer-readable statements.

As used herein, the term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIG. 7, can be downloaded and/or otherwise obtained by a mobile station and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile station and/or base station can obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A mobile station that is configured to perform common channel cancellation, comprising:
    a parameter estimation unit that is configured to estimate parameters for generating a common channel error;
    a common channel generation unit that is configured to generate the common channel error based on the parameters; and
    an adder that is configured to subtract the common channel error from received data samples.

2. The mobile station of claim 1, wherein the common channel error corresponds to a synchronization channel (SCH) in a Wideband Code Division Multiple Access (WCDMA) network.

3. The mobile station of claim 1, wherein the common channel error is generated and subtracted from the received data samples before multipath processing is performed.

4. The mobile station of claim 1, wherein the common channel error is generated and subtracted from the received data samples after multipath processing is performed.

5. The mobile station of claim 1, wherein the common channel is received from a base station that utilizes transmission diversity, and wherein the parameter estimation unit is configured to account for the use of transmission diversity by the base station.

6. The mobile station of claim 5, wherein the parameters comprise a common channel gain, and wherein the parameter estimation unit is configured to estimate the common channel gain between different pairs of channel impulse response estimates and equalizer taps.

7. The mobile station of claim 1, wherein the parameters comprise a common channel gain, and wherein estimating the common channel gain comprises:
    estimating the common channel gain relative to a reference second common channel;
    estimating gain of the reference second common channel; and
    multiplying the relative common channel gain and the reference second common channel gain.

8. A mobile station that is configured to perform common channel cancellation, comprising:
    means for estimating parameters for generating a common channel error of a common channel separate from a pilot channel, wherein the parameters comprise a common channel gain;
    means for generating the common channel error based on the parameters; and
    means for subtracting the common channel error from received data samples.

9. The mobile station of claim 8, wherein the common channel error corresponds to a synchronization channel (SCH) in a Wideband Code Division Multiple Access (WCDMA) network.

10. The mobile station of claim 8, wherein the common channel error is generated and subtracted from the received data samples before multipath processing is performed.

11. The mobile station of claim 8, wherein the common channel error is generated and subtracted from the received data samples after multipath processing is performed.

12. The mobile station of claim 8, wherein the common channel is received from a base station that utilizes transmission diversity, and wherein the means for estimating parameters comprises means for accounting for the use of transmission diversity by the base station.

13. The mobile station of claim 8, wherein the parameters comprise a common channel gain, and wherein the means for estimating parameters comprises:
    means for estimating the common channel gain relative to a reference second common channel;
    means for estimating gain of the reference second common channel; and
    means for multiplying the relative common channel gain and the reference second common channel gain.

14. A method for performing common channel cancellation, comprising:
    estimating parameters for generating a common channel error of a common channel separate from a pilot channel, wherein the parameters comprise a common channel gain;
    generating the common channel error based on the parameters; and
    subtracting the common channel error from received data samples.

15. The method of claim 14, wherein the common channel error corresponds to a synchronization channel (SCH) in a Wideband Code Division Multiple Access (WCDMA) network.

16. The method of claim 14, wherein the common channel error is generated and subtracted from the received data samples before multipath processing is performed.

17. The method of claim 14, wherein the common channel error is generated and subtracted from the received data samples after multipath processing is performed.

18. A computer-program product for performing common channel cancellation, the computer-program product comprising a computer-readable medium having instructions thereon, the instructions comprising:
- code for estimating parameters for generating a common channel error of a common channel separate from a pilot channel, wherein the parameters comprise a common channel gain;
- code for generating the common channel error based on the parameters; and
- code for subtracting the common channel error from received data samples.

19. The computer-program product of claim 18, wherein the common channel error corresponds to a synchronization channel (SCH) in a Wideband Code Division Multiple Access (WCDMA) network.

20. The computer-program product of claim 18, wherein the common channel error is generated and subtracted from the received data samples before multipath processing is performed.

21. The computer-program product of claim 18, wherein the common channel error is generated and subtracted from the received data samples after multipath processing is performed.

* * * * *